Patented Feb. 9, 1932

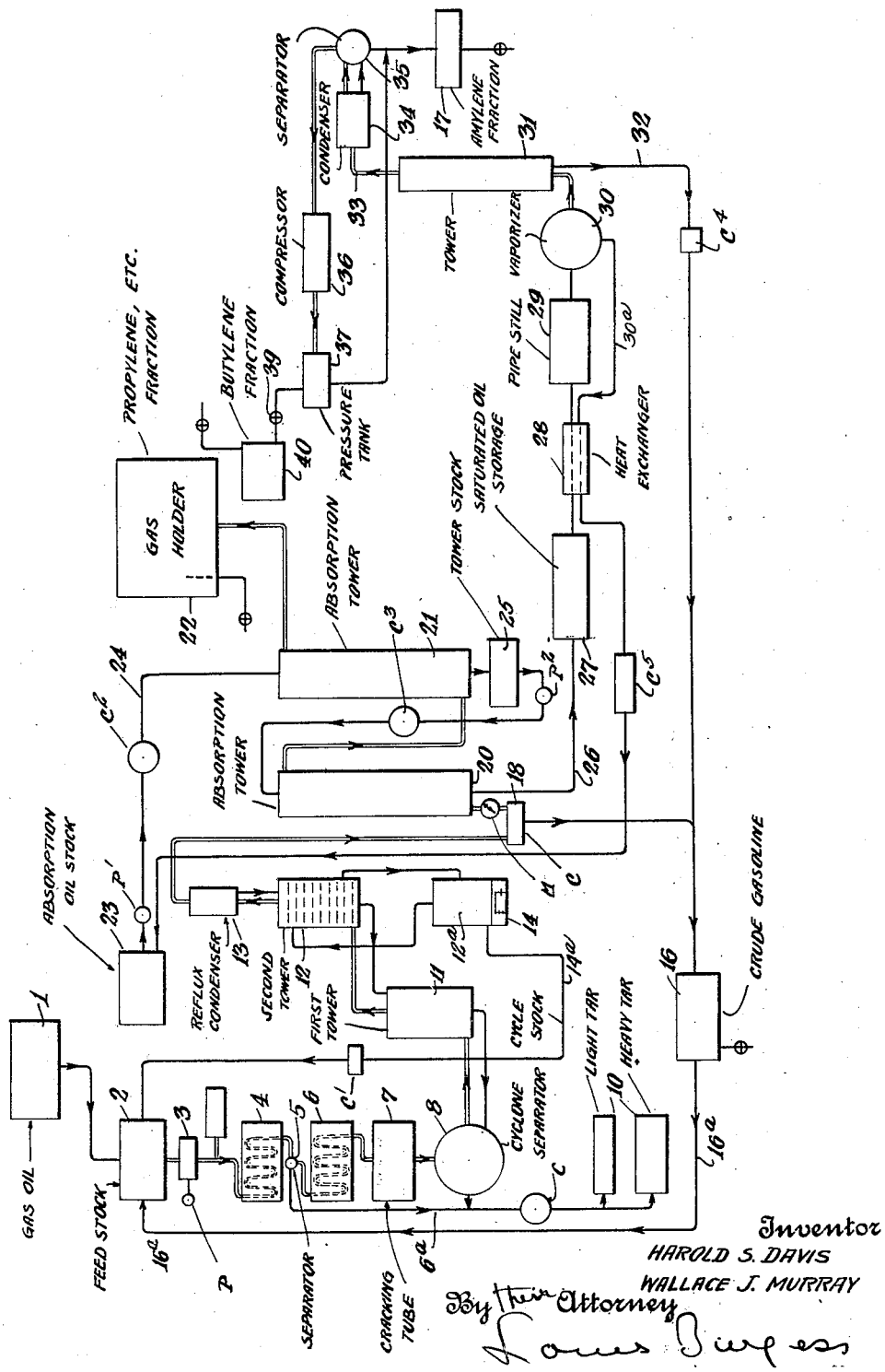

1,844,210

UNITED STATES PATENT OFFICE

HAROLD S. DAVIS, OF BELMONT, AND WALLACE J. MURRAY, OF READING, MASSACHU-SETTS, ASSIGNORS, BY MESNE ASSIGNMENTS, TO PETROLEUM CHEMICAL CORPORATION, OF NEW YORK, N. Y., A CORPORATION OF DELAWARE

PROCESS FOR GENERATING ISOPROPYL ALCOHOL FROM HYDROCARBONS CONTAINING OLEFINES

Original application filed February 24, 1925, Serial No. 10,992, and in Germany February 23, 1926. Divided and this application filed March 28, 1930. Serial No. 439,655.

This application is a division of parent application, Serial No. 10,992, filed February 24, 1925.

This invention relates to the preparation, segregation and utilization of olefine hydrocarbons and to the production of their derivatives, including alcohols and other useful substances. The olefines may be derived from such materials as petroleum, peat, coal, oil shales, and like carboniferous natural materials by cracking or pyrogenesis, so called.

The olefine mixtures produced by heating such substances to temperatures resulting in pyrogenetic transformations are, as is well known, exceedingly complex, generally containing ethylene, propylene, butylenes, amylenes, hexylenes and higher olefines of the general formula $C_nH_{2n}$. Unlike saturated hydrocarbons, olefines are capable of readily reacting or combining with reagents, including the polybasic acids (of which sulphuric acid or phosphoric acid are typical) the halogens and halogen compounds, hypochlorous and other acids.

The reaction of sulphuric acid with the olefines has been known since its discovery in Faraday's laboratory in 1826, and alcohols have been prepared from alkyl sulphuric acid products of this reaction on certain olefines by hydrolysis and distillation by numerous investigators since Berthelot's research in 1863. Derivatives of olefines have been made on a commercial scale in this country by first preparing an acid reactive liquor of sulphuric acid with oil gas since as early as 1906 (American Ether Company of Richmond, Virginia; P. Fritzsche, Zeitschrift fur angewandte Chemie, 1896, pp. 456, 459; Die Chemische Industrie, vol. 35, p. 637, 1912). Gases produced in the liquid phase cracking of petroleum have been similarly treated for the recovery of alcoholic mixtures including isopropyl, secondary butyl and amyl alcohols. These treatments, so far as we are aware, have been of a kind adapted to the incidental recovery at gas works or petroleum pressure stills of gases from cracking operations rarely containing more than 12% of olefines, and free from any substantial contents of very reactive highly cracked hydrocarbons such as the diolefines. When any attempt has been made to produce industrially from mixed olefine bearing gases, such as the waste gases from liquid phase cracking, acid reactive liquors capable of hydrolysis and distillation to obtain alcohols, sulphation has been carried out, so far as we are aware, by reaction upon the whole gaseous mixture with acid of a degree of concentration selected to reach a result necessarily in the nature of a compromise between destruction by polymerization or otherwise of the more reactive olefines, and incomplete sulphation; and hence, with partial recovery only of the realizable olefine values and with high acid consumption. Such processes are economically justifiable only when lean gases are available in great quantities otherwise wasted. They are not so justifiable when the gas to be treated is rich in olefines so reactive as to be converted into polymers while making the olefine-acid compound of a less reactive remainder. When the olefine bearing gas is rich in highly reactive olefines, a single-stage treatment to obtain acid products cannot be practised; the reaction of the more highly reactive olefines and other hydrocarbons to polymer under treatment with acids capable of forming addition compounds with the less reactive olefines is too vigorous and too productive of heat to permit this even in the case of relatively lean gases.

The known procedure has therefore been to destroy the very reactable olefines in one lot of acid, and sulphate the remainder in another lot of acid.

If it were practicable to obtain mixed alkyl acid compounds and other derivatives of the rich gases, such as result from vapor phase cracking directed to the production of olefines, by a group reaction with acid, the result would not be desirable. The different alcohols, at least eight in number, resulting from hydrolysis of the obtainable compounds have boiling points ranging from 80° to 140° C., and separation from each other is in most cases not feasible. The uses of these alcohols (e. g. isopropyl and amyl alcohols) are widely divergent, and to produce them in admixture would be commercially undesirable.

This process provides a treatment of olefine hydrocarbons, liquid or gaseous, particularly mixed hydrocarbons resulting from as complete generation of these substances as possible from a suitable hydrocarbon material or carboniferous material of the classes above enumerated, and therefore occurring richly in the material presented for treatment, and containing the very reactive highly cracked hydrocarbons such as the diolefines, isobutylene, trimethylethylene, unsymmetrical methyl-ethyl-ethylene, and other unsaturated bodies having a high reactive affinity for combining acids or other reactants, and also containing other olefines of a lower order of reactivity toward the said combining agents; for example propylene, isopropyl, ethylene, butene-1, butene-2, pentene-1 and pentene-2.

This new process thus provides a mode of treatment applicable to hydrocarbon products rich in highly reactive or unsaturated olefines to recover valuable derivatives and segregate the olefine substances in the order of their chemical activities toward reagent substances, for example polybasic acids; and which will permit the separation production, severally or in groups, of olefine compounds, such as the olefine-acid compounds capable of hydrolysis or other after-treatment and separation, leading to separate production of the consequent different alcohols, or other olefine derivatives. An object attained by the process is the separation of complex olefine mixtures, especially mixtures rich in olefines, into fractions substantially according to the order of the molecular weights of their principal contents, and the treatment severally of these fractions for the optimum production of valuable derivatives, e. g., the appropriate alcohols, in a relatively pure and unmixed state; and without substantial destruction at any stage of this separation of any of the several fractions at the respective stage of the operations.

The process conserves for use at a further stage of the process such of the reactive olefines as are not concerned at any stage of the process in the reaction contrived and intended to produce a particular derivative or intermediate. The recommended procedure comprises a stage or stages of separation of a fraction or fractions of the material containing the olefine or olefine groups to be recovered, followed by treatment selectively to differentiate and segregate the component olefines substances in accordance with their respective and relative chemical reactivities. In general it may be stated that the preferred raw material contains more than 30% of unsaturated hydrocarbons.

It is advantageous, in the practice of this process, to proceed upon a basis of known contents of the raw material, and for this purpose a preferred raw material for the process is petroleum, treated by any process of vapor phase cracking tending to produce a product rich in olefines and preferably substantially free from normally liquid paraffine derivatives. A suitable and preferred raw material is the constant and controllable mixture produced by the process described in the application for Letters Patent by Earl P. Stevenson and Clarence K. Reiman, Serial No. 8,907, filed February 13, 1925, which comprises subjecting vapors of a petroleum or a fractional distillate of petroleum, for example "gas oil", so called, to heat during flow in a tubular retort heated at successive zones thereof to differing degrees, with the effect of maintaining the vapors at a nearly constant cracking temperature during a substantial time of flow, this constant temperature being such as to result in optimum development of olefine values. For this purpose, a cracking temperature maintained nearly constant at a selected value between 600° C. and 650° C. during a sufficient time of flow to produce from 1000 to 1700 cubic feet of gaseous product per barrel of 42 gallons passed produces satisfactory material for this treatment. The preferred vapor-phase cracking temperatures are higher than those heretofore known for the commercial production of motor spirit, which do not exceed 500° C., so far as I am aware (Lewes, Journal Society of Chemical Industry, vol. XI, page 585) and are not such high temperatures (700° to 1000° C.) as are used for making oil gas by the known methods of Pintsch, Fritzsche or Ullmann.

The invention will therefore now be described as carried out upon the gaseous efflux of vapor phase cracking of petroleum so contrived as to produce a vaporous and gaseous efflux which, when stripped of a motor spirit fraction, is exceedingly rich in the olefine substances above mentioned. But it will be understood that this process is applicable without change, except in degree, to the treatment of other complex olefine mixtures, and that the specific instances now to be described are described by way of illustration of the invention, and are not to be viewed as comprising every instance of practice according to the invention.

In the accompanying drawing, the figure is a diagrammatic flow sheet showing a preferred assemblage of apparatus illustrative of certain physical stages of separation of the material treated.

The process to be described comprises, in general, submitting the olefine-bearing gases to treatment for the physical separation of fractions containing groups of olefine substances capable of chemical segregation concomitantly with the formation of olefine-acid compounds, emulsions, or solutions, under conditions permitting the segregation severally of derivatives, for example alcohols resulting from hydrolysis of these compounds.

Referring to the drawing, a container 1 for the suply of oil may deliver to a feed stock reservoir 2, whence by a suitable pressure device 3 the material is forced into a preheater or primary vaporizer 4 (preferably a suitable tubular coil) and through a superheater or secondary vaporizer 6, which may be substantially the same kind of tubular heater as the primary preheater 4. Between the preheater 4 and superheater 6 the flowing stream, already substantially all vapor, may be subjected to treatment adapted to separate out the inclusions of low volatility, and pass on the vapors and gases. A liquid separator 5, preferably of a kind operating without substantial loss of heat, is recommended. Collected liquids from this separator may flow through a pipe 6$^a$ and a cooler C to tar storage tanks 10.

Vapors superheated at 6 pass to a cracking tube 7. The effluent gases, vapors and suspensions from cracking are recommended to be treated in a separator 8, which may work on the cyclonic or centrifugal principle, and deliver its liquid separates into the pipe 6$^a$, and its vaporous and gaseous efflux into the bottom of the first of a series of separating and condensing towers, for example, the tower 11, adapted to counter-current flow in contact of the vapors and gases and the condensate from tower 12, which in turn is adapted to counter-current flow of the vapors and gases and the condensate from a fractionating condenser 13 of any suitable reflux type.

The tower 12 is preferably a fractionating tower of the bubble type. From the bottom is taken a relatively heavy fraction which is delivered into the top of tower 11, wherein it serves to condense and wash out any heavy and undersirable tars formed in the cracking reaction. From one of the lower plates of this tower is drawn off a fraction of substantially the same boiling range as the feed stock, but as this will, of necessity, contain some hydrocarbons in the motor spirit range, it cannot be returned to the feed stock without materially decreasing the yield of motor spirit. Provision is included, therefore, for stripping this fraction of its lighter hydrocarbons, such as a fractionating tower 12$^a$, which is heated at the base at 14 and delivers overhead the desired fraction of its feed into one of the top plates of tower 12. The stripped cycle stock is delivered through a pipe 14$^a$ and cooler C' to the feed stock tank. The overhead from 13 is cooled at 18, and the condensate at this point is crude motor spirit in the preferred operation of tower 12.

The vaporous effluent from condenser 18 is now fractionally condensed or absorbed, or otherwise treated to separate olefine fractions, which from their preponderant contents, may be described as an amylene fraction, a butylene fraction, and a gaseous fraction rich in propylene and ethylene, and hereinafter referred to as a propylene fraction. For example, the gaseous effluent from condenser 18 may be delivered through meter M and scrubbed in absorption towers 20 and 21 by a counter-current flow of cool absorption oil stored in tank 23, delivered by a pump P$^1$ through a cooler C$^2$ and pipe 24 to the top of tower 21, to receiver 25, pumped at P$^2$, through a cooler C$^3$ to the top of tower 20, and the saturated oil delivered through a pipe 26 to a storage tank 27, whence the saturated oil may flow through a heat exchanger 28, pipe still 29 and vaporizer 30 to a refluxing tower 31, from which the liquids may be led through cooler C$^4$ to the crude motor-spirit or gasoline storage tank 16 by pipe 32. Unvaporized absorption oil from vaporizer 30 may flow through pipe 30$^a$, heat exchanger 28, and cooler C$^5$ to tank 23.

The vaporous effluent at 33 may be delivered through a condenser 34 and a separator 35, whence the vapors pass to a compressor 36 and pressure storage tank 37. Condensates at 34, 35 and 37 may be delivered to tank 17, the pressure and temperatures being such as to provide at these points liquid fractions corresponding to the amylene-fraction fluid in tank 17. Pressure tank 37 may deliver, if desired, through a suitable reduction valve 39 to gas-holder 40, in which are collected the residual gases from the saturated scrubbing oil. This gaseous fraction, if so separated, represents substantially the major portion of the butylene hydrocarbons, whereas the residual gas from tower 21, collected in the holder 22, contains the propylene and ethylene.

When appropriate conditions are realized in and prior to flow through the cracking tube 7, the respective fractions capable of being separated by steps of condensation or absorption are sharply characterized by the desired preponderance (amounting under good conditions to substantial freedom from mixture with each other) of the olefine substances sought to be collected and separated. Any suitable condensation or absorption fractionating treatment may therefore be resorted to, and the apparatus mentioned may be varied in accordance with engineering preferences.

Under preferred conditions, cracking in the tube 7 is at a relatively constant temperature at or about 600° C. to 615° C.

The following typical example of operation of the vapor phase cracking process above described and the segregation of the olefines into comparatively simple fractions shows the relative amounts involved and the quantity of each fraction:

*Results of 32-hour run (quantities per bbl. throughout)*

1. Gas oil used, 31° Baumé.
2. Crude motor-spirit recovered_ 74.5 lbs.
3. Cycle stock_____ 110 lbs.
4. Fuel oil_____ 30 lbs.
5. Process gas at M (rich gas)_ 80 lbs. (1040 cu. ft.)
6. Residual gas from compression to 250 pounds per sq. in_____ 33.4 lbs. (533 cu. ft.)
7. Pressure condensate_____ 40.61 lbs.

*Products from pressure condensate*

8. Amylene fraction (liquid).
   (a) Up to 25° C_____ 4.51 lbs.
   (b) 25°-45° C_____ 5.15 lbs.
9. Butylene fraction (gaseous)____ 19.6 lbs. (181 cu. ft.)
10. Light naphtha (included in 2)__ 11.35 lbs.

These results are from separation by compression, distillation and condensation. When the absorption step, as described above, is resorted to, typical results are as follows:

Feed stock—32°-34° Bé. gas oil (from South Texas crude.)
Feed rate—1 bbl. per hour per six inch cracking tube.
Temperatures—
   Vaporizer_____ 632° C. maximum
   Tube_____ 601° C. (average)

*Tube sections (averages)*

Entrance   2       3       4       5       6
595° C.   602° C. 602° C. 603° C. 606° C. 603° C.

*Conversions per bbl. passed*

Oil scrubbed gas (sp. gr. 0.929)_____ 1035 cu. ft.
Process gas (sp. gr. 1.055)_____ 675 cu. ft.
Butylene fraction (non-condensed gas from distillation of saturated absorption oils) (sp. gr.—1.52)_____ 102 cu. ft.
Amylene fraction (condensibles recovered by fractionation to 60° C.)_____ 2.6 gallons
Crude naphtha (condensibles between 60° and 210° C.)_____ 9.3 gallons
Cycle stock (condensibles above 210° C.)_____ 19 gallons
Tar residues_____ 2.1 gallons

*Olefine content of gaseous fractions=*
Process gas % olefines above ethylene_____ 33.1
Oil scrubbed gas olefines above ethylene_____ 17.8
Butylene fraction olefines above ethylene_____ 75.7

Vapor phase cracking of the preferred practice having been carried on at the temperatures mentioned, the products are chiefly unsaturated, being largely olefines with some naphthenes and aromatic hydrocarbons, together with almost negligible amounts of saturated or paraffin hydrocarbons, particularly in the lighter liquid fractions. The olefine content of the gas prior to compressing or oil scrubbing to remove condensibles may be as high as 54% by volume in the operation of an appropriate vapor phase cracking process, for example that described. For comparison, the olefine content of pressure-still gases is seldom higher than 10%, and is usually under 8%, justifying designation as lean gases.

The aggregate chemical character of these two classes of olefine mixtures is likewise quite different, so that steps for the recovery of derivatives applicable to the lean gases are not applicable to the richer mixtures. The olefines in pressure-still gases have a high proportion of normal olefines, and do not contain substantial amounts of the very reactive, highly cracked hydrocarbons, such as the diolefines.

The recommended steps above described, for which other procedures may of course be substituted within the invention so long as the results are produced, result in a fractionation of the olefines as follows:

|  |  | Boiling points= |
|---|---|---|
| Gaseous | Ethylene | −103° C. |
|  | Propylene | −48.4° C. |
|  | Butylenes { Iso-butylene | −6° C. |
|  | Butene-1 | −5° C. |
|  | Butene-2 | +1° C. |

|  |  | Boiling points= |
|---|---|---|
| Liquid | Amylenes { Isopropyl ethylene | 21° C. |
|  | Unsym. methyl-ethyl-ethylene | 31° to 33° C. |
|  | Pentene-2 | 36° C. |
|  | Trimethyl ethylene | 37° to 42° C. |
|  | Pentene-1 | 39° to 40° C. |
|  | Hexylenes | 55° to 75° C. |
|  | Higher olefines, up to | 150° C. |

Associated with the amylenes and butylenes are substantial inclusions of diolefines, believed to be butadiene, isoprene, and their homologues.

We are aware of no practical arrangement of conditions or procession of reagent substances by which any whole mixture of these gaseous substances can be treated to yield in succession the derivatives of the unsaturated hydrocarbons present in them in amounts constituting valuable sources of materials needed for industrial uses. But we have nevertheless determined that the substances are reactive with the polybasic acids, for example sulphuric acid, in a certain order, ethylene being the least reactive as follows:

|  | Boiling points | State |
|---|---|---|
| 1. Ethylene $CH_2=CH_2$ | −103.° C. | Gas |
| 2. Propylene $CH_3-CH=CH_2$ | −48.4° C. | Gas |
| 3. Pentene-1 $CH_3-CH_2-CH_2-CH=CH_2$ | 39–40° C. | Liquid |
| 4. Pentene-2 $CH_3-CH_2-CH=CH-CH_3$ | 36° C. (741 mm.) | Liquid |
| 5. Butene-1 $CH_3-CH_2-CH=CH_2$ | −5° C. | Gas or in solution |
| 6. Butene-2 $CH_3-CH=CH-CH_3$ | +1° C. | Gas or in solution |
| 7. Isopropyl ethylene $\begin{array}{c}CH_3\\CH_3\end{array}\!\!>\!CH-CH=CH_2$ | 21.1° C. | Liquid |
| 8. Unsymmetrical methyl ethyl ethylene $\begin{array}{c}CH_3\\CH_3-CH_2\end{array}\!\!>\!C=CH_2$ | 31 to 33° C. | Liquid |
| 9. Trimethyl ethylene $\begin{array}{c}CH_3\\CH_3\end{array}\!\!>\!C=C\!<\!\begin{array}{c}CH_3\\H\end{array}$ | 37 to 42° C. | Liquid |
| 10. Iso-butylene $\begin{array}{c}CH_3\\CH_3\end{array}\!\!>\!C=CH_2$ | −6° C. | Gas or in solution |

To absorb ethylene and produce ethyl sulphuric acid it is necessary to use hot concentrated acid which will substantially polymerize all other olefines above propylene in reactivity; the propylene will also be polymerized.

With 100% acid below 30° C., there is no appreciable absorption of ethylene and the absorption of propylene is very rapid, but the yield of isopropyl alcohol will be small due to the excessive polymerization when and if the gas treated contains the more reactive olefines in the amounts in which they naturally occur.

The following causes may be responsible for this phenomenon:

(1) The reactive olefines evolve so much heat on contact with the sulphuric acid that local overheating occurs which tends to polymerize all the dissolved products including propylene.

(2) The reactive olefines combine with the sulphuric acid more rapidly than propylene and decrease the ability of the acid to absorb the latter.

(3) 100% sulphuric acid can easily act as an oxidizing agent toward the reactive olefines and the water evolved dilutes the acid and lowers its power to absorb olefines.

Per contra, if the gas is treated with acid of a strength adapted to absorb trimethyl ethylene and of the proper strength and under the optimum conditions to absorb the olefines which yield tertiary derivatives (Nos. 8, 9, 10 above) there is no substantial absorption of the lighter and simpler olefines such as propylene. For a quantitative idea of the great variations in reactivity manifested by these olefines towards sulphuric acid, isobutylene is several hundred thousand times as reactive as ethylene.

In the case of isopropyl ethylene, which so far as we are aware has never, previous to the research leading to this invention, been converted into an alcohol through reaction with sulphuric acid, acids of sufficient strength to absorb pentene-1 and pentene-2 quantitatively polymerize isopropyl ethylene at temperatures below 30° C. Higher temperatures and more concentrated acid than this are required to absorb the other olefines for the results desired, and the conditions for securing a good yield of amyl alcohol from this particular olefine substantially polymerize the other olefines except ethylene and propylene present in this mixed gas.

By the fractionating procedure above described we have avoided any necessity to subject to sulphuric acid absorption all of the reactive olefines at once, and any necessity for producing alcohols incapable of being subsequently separated.

By processes extending and developing the results of this invention, some of which are the work of others and no part of this invention, at least eight different alcohols may be produced from the vapor-phase cracked hydrocarbons, having a boiling range extending from 80° to 140° C.

If these were produced conjointly it would be impractical subsequently to separate them, and as the uses (of isopropyl and amyl alcohols, for example) are widely divergent, such a mixture would be of little or no commercial value. As a specific example of this difficulty two pairs of alcohols that cannot be separated by fractional distillation are:

Isopropyl alcohol (constant boiling mixture)—boiling point 80.4° C.

Tertiary butyl alcohol—boiling point 79.92° C.

Tertiary amyl alcohol—boiling range 101.6° to 102° C.

Secondary butyl alcohol—boiling point 99.5° C.

The processing of the total olefines present in a cracked petroleum product to secure tertiary as well as secondary derivatives calls for a further departure from the art as practiced where tertiary derivatives are not recovered. The usual procedure is to moderately dilute the product from sulphuric acid absorption with water and then distill. The point to which this dilution must be carried to avoid destruction by the action of the sulphuric acid on the alcohols during distillation varies with the different alcohols but in the case of secondary alcohols there is little hazard in distilling from 25% acid solution. Tertiary alcohols, however, behave quite differently and tertiary amyl alcohol, for example, cannot safely be distilled from even a one per cent solution without substantial decomposition. The preferred procedure for recovering tertiary alcohols from admixture with sulphuric acid is to neutralize as with lime and distill from a neutral solution.

It will be obvious that this procedure is not practical when applied to a complex sulphuric acid product containing small percentages of tertiary bodies as compared to secondary bodies. It becomes practical and feasible when the tertiary bodies are concentrated and segregated as in the practice of this invention.

The procedure above described, to avoid the difficulties and provide the advantages just adverted to, separates the material into groups capable of being reacted upon preferentially in respect to their constituent members, thus enabling separations of the acid combinations with the constituent members of these groups severally. So far as there is advantage in separating them, these groups are:

(1) The gaseous fraction containing ethylene and prophylene.

(2) The butylene fraction containing isobutene and butene-1 or butene-2 or both of the initial low-boiling distillate fraction, and (3) The residue of the condensate which may contain each of the five isomeric amylenes, with varying amounts of hexylenes and higher olefines.

Fraction (1) may now be treated in accordance with the specific relative properties of its constitutents. Because this fraction will contain traces of diolefines and olefines more reactive than propylene, owing to the practical and obvious limitation of any system for physical fractionation, it is desirable to treat this fraction first with sulphuric acid, by tower scrubbing, of a strength that will selectively react upon the olefines (more reactive than propylene) therein present. In the preferred procedure this fraction is first scrubbed with acid of 80–84% strength and is then subjected to the action of sulphuric acid having a concentration from 95 to 100% at a temperature preferably below 30° C., whereupon propylene is substantially absorbed. The ethylene remains relatively unaffected and may be preserved and used in the gaseous condition, or subsequently be reacted upon, as for example by absorption in hot sulphuric acid resulting in the formation of ethyl sulphuric acid; or treated in any known way to produce ether. Specific and preferred modes of treating fraction (1) for the recovery of these values form no part of the present invention.

Gaseous products belonging to other series of hydrocarbons which may be present in minor quantities as impurities, either remain in the gaseous state, as in the case of methane or ethane, or remain unabsorbed by the acid treatments; or, as in the case of acetylenes, are converted into heavy compounds readily separable from the remainder, as by fractional distillation. If present, such bodies are not found in important quantities, and the resulting polymer is a heavy oily compound, of relatively uniform characteristics. In practice with hydrocarbon mixtures obtained as herein described the proportional amounts both of such extraneous gaseous products and of the heavy oily polymer resulting from acid treatment are relatively small.

Upon hydrolysis of the acid compounds severally obtained as described, under suitable conditions, as by the addition of water or steam, and distilling at corresponding temperatures, ethyl and isopropyl alcohols respectively may be recovered in the distillates, leaving a residue of substantially alcohol-free sulphuric acid.

The butylene fraction (2) capable of economic use contains butylenes difficult to separate from each other by distillation. Of these butene-1 and butene-2 are less reactive chemically than iso-butylene. Derivatives of butene-1 and butene-2 as a consequence of the intramolecular structure of these substances have a secondary molecular formation, whereas derivatives of iso-butylene have a tertiary structure. This may flow from the structure of iso-butylene, conceived as a central carbon atom linked to three other carbon atoms, one inter-carbon bond being a double bond. As for example, the addition of water ($H_2O$) produces a tertiary alcohol having the structure:

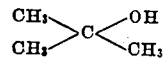

Preferred procedures therefore comprise reacting upon the butylene fraction in the order of reactivity of these component substances, to form in several succession tertiary and secondary derivatives.

For example, the butylene fraction containing isobutene, butene-1 and butene-2 (all gaseous) is passed through sulphuric acid of a concentration of 60% more or less in such manner as to effect as intimate a contact between the gas and the acid as possible, for the purpose of absorbing isobutene. Recommended apparatus comprises an interrupted flow tower with glass or other inert packing arranged for counter-current flow of gas and acid. Isobutene is very highly reactive; a satisfactory differential absorption is practicable at all ordinary temperatures. The isobutene is here selectively absorbed, leaving the butene-1 and butene-2 and other gases, if any, which are then conducted through sulphuric acid of a concentration of 80%, more or less, by which the butene-1 and butene-2 are substantially absorbed. One of the advantages of this procedure arises from having removed the substances reacting to tertiary compounds, since the reaction of the secondary-alcohol-forming substances with stronger acid for their conversion evolves heat of lesser degree, and the natural rise of temperature, for example to 40° C., may be permitted to take place, unless acid more concentrated than 80% is resorted to, in which case it may be desirable to hold the temperature down to a point below 15° C. These reactions are preferably carried out in a tower similar to the tower just mentioned; one tower may be used if arrangement is made to collect the gaseous efflux and repass it, supplying the more concentrated acid on the second passage and separately collecting the liquid efflux from the first and the second passage.

The liquid from the first of said steps contains the isobutene either absorbed in the acid or in the form of tertiary butyl alcohol by auto-hydrolysis in the dilute acid; this may be further diluted for complete hydrolysis and the alcohol distilled therefrom. Preferably the dilute liquid is neutralized with an alkali before distillation, to result in a much higher yield of the tertiary butyl alcohol by avoidance of reaction with the acid during distillation.

The liquid from the second step of treatment contains the butene-1 and butene-2 and this liquid may be diluted for complete hydrolysis into the secondary butyl alcohol, and thereafter distilled without neutralization to obtain a high yield of secondary butyl alcohol. The distillate may be dehydrated, if desired, by any usual or customary water-absorbent chemical treatment, such as treatment with lime or caustic.

The amylene fraction (3) whether collected by absorption as described or by pressure condensation and fractional distillation of fraction (1) (propylene, ethylene, etc.) consists preponderantly of the amylenes and may contain hexylenes and higher olefines as well as hydrocarbons of the group $C_nH_{2n-2}$. This liquid mixture, which typically contains less than 5% of paraffins, may advantageously be distilled into three parts corresponding to temperatures:

(a) Up to 25° C.
(b) 25 to 45° C.
(c) Above 45° C.

Since the lower or more volatile olefines have been substantially removed as above described, distillate (a) consists primarily of isopropyl ethylene, distillate (b) of pentene-1, pentene-2, unsymmetrical methyl-ethyl-ethylene, and trimethyl ethylene, and distillate (c) contains the hexylenes and heavier or higher boiling olefines.

The amylene fraction (3) can be treated with sulphuric acid in stages, or the fractions (a) and (b) can be processed separately and with some advantage.

Distillate (a) contains predominant quantities of isopropyl ethylene. The specific treatment of this distillate forms no part of our invention herein claimed.

In order to secure substantial yields of all alcohols derivative from the mixed amylenes of fraction (b) it is desirable to remove the hydrocarbons of the group $C_nH_{2n-2}$ (and any still less saturated hydrocarbons) which may be present. Either of the alternative processes is satisfactory at this stage.

It has been found, for example, that by treating this fraction first with concentrated hydrochloric acid, the amylenes which are convertible into tertiary derivatives are substantially converted into chlorides which, owing to their relatively high boiling points, can be easily separated from the unchanged amylenes. The resulting mixture of chlorides on hydrolysis, carried on preferably with the addition of lime or caustic soda, yields tertiary alcohols.

We do not herein claim the specific method of recovery with the aid of hydrochloric acid treatment.

Alternatively the amylene fraction (3) of the olefine gases may be treated with sulphuric acid having a concentration of 60% more or less, which promotes the formation of tertiary alcohols by bringing about the addition of water to isobutene trimethyl, ethylene, unsymmetrical methyl-ethyl-ethylene and probably some of the higher olefines while concurrently effecting the polymerization of diolefines and those hydrocarbons of a lesser degree of saturation than the olefines into heavy, oil-like polymers which, on account of diversity of boiling points, may be separated by fractional distillation, or other appropriate means, from the unchanged olefines.

As the result of this preliminary reaction, for example either the said hydrochloric or sulphuric acid treatments, a highly refined amylene fraction remains after treatment, which fraction is substantially a mixture of isopropyl ethylene, pentene-1 and pentene-2, and which does not contain appreciable amounts of the other olefines, though there is no disadvantage in the presence of substantial amounts of the normal butylenes and hexylenes at this stage, since these olefines are of the same order of activity as the amylenes therein present, and their derivatives can easily be separated from those of the amylenes by fractional distillation.

Addition of sulphuric acid of a concentration of 77% more or less to this refined amylene causes absorption with concurrent formation of the corresponding intermediates of the alcohols from which the corresponding alcohols may be recovered by dilution and distillation.

To further illustrate the advantage of this invention we have treated the rich gas from vapor phase cracking as described, without first removing the amylene fraction, with 95% acid. The result was an evolution of excessive heat, rendering control difficult, if not impossible, and the recovery of small amounts only of secondary alcohols, and no tertiary alcohols. There were also formed large quantities of heavy tar-like polymers. By first removing the olefines higher than propylene we have successfully used fuming sulphuric acid as an absorbent for the remainder, obtained an alcohol yield of 40% of the weight of acid used, and minimized the polymer formation to under 50% of the alcohol produced.

For specific examples of treatment of the amylene fraction 3, (b) we have obtained the following results:

*Example 1*

From the processing of 32° Bé. gas oil under the conditions mentioned for example above, there is obtained 2.6 gallons of amylene fraction (condensibles recovered by fractionation to 60° C.) per barrel passed. The preferred treatment of this fraction and its results are as follows:

To the 2.6 gallons of amylene fraction we first add 12.2 lbs. of sulphuric acid (65%) under conditions of thorough agitation keeping the mixture preferably below 20° C., and continue this treatment over a period of 6 hours as a maximum, adding the acid in two equal portions at 3 hour intervals. At the end of this period agitation is stopped and the mixture allowed to settle for a time sufficient to result in separation into two well-defined layers. We first draw off the lower or acid layer, which is carefully neutralized with caustic and distilled, preferably through a fractionating column, cutting when the temperature reaches 100° C. at the top of the column. Under these specific conditions we recovered in this example .28 gallons of crude tertiary alcohols per 2.6 gallons of amylene fraction treated.

The residual hydrocarbons from this treatment to recover tertiary alcohols are distilled through a fractionating column from a slightly alkaline mixture, and the distillate up to 60° C. is segregated and treated for conversion into secondary alcohols.

Starting with 2.6 gallons of amylene fraction, there is recovered 1.1 gallons of hydrocarbons boiling up to 60° C. which are now treated with 77% $H_2SO_4$ in two portions, each of .55 gallons or 7.65 lbs. In this stage the temperature is allowed to rise to 35° C. and maintained at under 40° C. preferably, and agitation is continued over a total period of six hours. The mixture is then allowed to settle and the lower or acid layer is drawn off, diluted with water to bring the concentration of acid below 20%, and then distilled until practically all of the alcohol is carried over. The distillate consists of two layers, a lower or water layer and an upper or alcohol layer. From the 2.6 gallons of amylene fraction at the start of this processing, there is recovered under the above specific conditions .56 gallons of crude secondary alcohols.

Secondary and tertiary butyl alcohols are successfully recovered from the butylene fraction by first scrubbing with 65% more or less sulphuric acid, and then with 77% more or less sulphuric acid, as above described.

*Example 2*

Concurrently with the production of 2.6 gallons of amylene fraction there is recovered 102 cu. ft. of butylene fraction as set forth in the example above of a typical vapor phase cracking operation. As stated, this fraction can be absorbed under pressure or by cooling or both in the amylene fraction; or it can be treated separately to produce tertiary and secondary butyl alcohols. The following is an example of separate treatment:—

The butylene fraction is first scrubbed or treated with a relatively dilute sulphuric acid, followed by more concentrated acid. We have obtained satisfactory results by using in the first absorption stage 65% acid and in the second 77% acid. The amount of acid required depends upon the physical efficiency of the absorption apparatus employed in large measure; using even comparatively inefficient apparatus, an acid efficiency can be realized wherein three pounds of acid (calculated as 93%) produces one pound of alcohol. From the treatment of 100 cu. ft. of the butylene fraction herein described, we have produced .28 gallon of tertiary and .46 gallon of secondary alcohols.

During the absorption of the butylene in the treatment for tertiary alcohol with the particular reagents mentioned above we prefer to keep the temperature below 20° C., and during the secondary stage at about 35° C. As in the case of the tertiary amyl alcohol, it is necessary to distill the tertiary butyl alcohol from a neutral or slightly alkaline solution to secure the highest yields, though tertiary butyl is not subject to decomposition in acid distillation in the same degree as tertiary amyl alcohol.

Wherever in this specification particular concentrations of acid reagent substances adapted to olefine absorption are alluded to, it will be understood according to the common knowledge of the numerous chemists familiar with the behavior of acids toward olefines for nearly a century, that the acid concentration is relative to the respectively mentioned or to normal temperatures, and that at different temperatures another concentration of acid is equivalent, within those limits at which the action of the acid reagent ceases to become an absorption, and enters upon the destructive formation of the compounds herein alluded to as polymers.

For the operations of fractional treatment with $H_2SO_4$ e. g. of the amylene fraction (b), we recommend the use of apparatus comprising a chamber adapted to be heated or cooled, and equipped for mechanical agitation of its contents; adapted for the slow feed of acid of the appropriate concentration; suitable settling vessels for decanting off the unchanged residue of the materials of lesser reactivity; and appropriate vessels for acid reaction upon the decanted residue. Distillation of the olefine-acid liquors may proceed in appropriate steam stills. In essentials, the units of apparatus required are familiar in the practice of the chemical industries, and one of the advantages of this invention resides in the relatively simple nature of the instruments and operations required.

We claim:

1. In the process of generating isopropyl alcohol from a mixture of hydrocarbons produced by cracking petroleum oil and containing olefines of 2, 3, 4 and 5 carbon atoms to the molecule, the steps of separating from said mixture by distillation a fraction, substantially free from olefines of 4 and more carbon atoms to the molecule, the said fraction containing olefines of 2 and 3 carbon atoms to the molecule, and selectively sulphating olefines of 3 carbon atoms to the molecule contained in said fraction by admixing said fraction with aqueous sulphuric acid, while maintaining an acid concentration and a temperature at which sulphation of the said olefines of 3 carbon atoms to the molecule takes place with the resultant formation of propyl sulphate.

2. Process according to claim 1, in which the selective sulphation of olefines of 3 carbon atoms to the molecule in said fraction is accomplished by contacting said fraction with aqueous sulphuric acid of from 95 to 100%, $H_2SO_4$ content.

3. Process according to claim 1, in which the selective sulphation of olefines of 3 carbon atoms to the molecule contained in said fraction is accomplished by contacting said fraction with aqueous sulphuric acid of from 95 to 100%, $H_2SO_4$ content, at temperatures not exceeding 30° C.

4. In the process of generating isopropyl alcohol from a mixture of hydrocarbons produced by cracking petroleum oil consisting predominantly of olefines and containing olefines of 2, 3, 4 and 5 carbon atoms to the molecule, the steps of separating from said mixture by distillation a fraction, substantially free from olefines of 4 and more carbon atoms to the molecule and containing olefines of 2 and 3 carbon atoms to the molecule, and selectively sulphating olefines of 3 carbon atoms to the molecule contained in said fraction by admixing said fraction with aqueous sulphuric acid, while maintaining an acid concentration and a temperature at which sulphation of the said olefines of 3 carbon atoms to the molecule takes place with the resultant formation of propyl sulphate.

5. Process according to claim 4, in which the selective sulphation of olefines of 3 carbon atoms to the molecule contained in said fraction is accomplished by contacting said fraction with aqueous sulphuric acid of from 95 to 100%, $H_2SO_4$ content.

6. Process according to claim 4, in which the selective sulphation of olefines of 3 carbon atoms to the molecule contained in said fraction is accomplished by contacting said fraction with aqueous sulphuric acid of from 95 to 100%, $H_2SO_4$ content, at temperatures not exceeding 30° C.

7. In the process of generating isopropyl alcohol from a mixture of hydrocarbons produced by vapor phase cracking of petroleum oil consisting predominantly of olefines and containing olefines of 2, 3, 4 and 5 carbon atoms to the molecule, the steps of separating from said mixture by distillation a fraction, substantially free from olefines of 4 and more carbon atoms to the molecule, and selectively sulphating olefines of 3 carbon atoms to the molecule contained in said fraction by admixing said fraction with aqueous sulphuric acid, while maintaining an acid concentration and a temperature at which sulphation of the said olefines of 3 carbon atoms to the molecule takes place with the resultant formation of propyl sulphate.

8. Process according to claim 7, in which the selective sulphation of olefines of 3 carbon atoms to the molecule contained in said fraction is accomplished by contacting said fraction with aqueous sulphuric acid of from 95 to 100%, $H_2SO_4$ content.

9. Process according to claim 7, in which the selective sulphation of olefines of 3 carbon atoms to the molecule contained in said fraction is accomplished by contacting said fraction with aqueous sulphuric acid of from 95 to 100%, $H_2SO_4$ content, at temperatures not exceeding 30° C.

HAROLD S. DAVIS.
WALLACE J. MURRAY.